United States Patent Office.

ALEXANDER McKENZIE, OF HENRY, ILLINOIS.

*Letters Patent No. 75,560, dated March 17, 1868.*

---

IMPROVED INSECT-DESTROYER.

---

*The Schedule referred to in these Letters Patent and making part of the same.*

---

TO ALL WHOM IT MAY CONCERN:

Be it known that I, ALEXANDER McKENZIE, of Henry, in the county of Marshall, and State of Illinois, have invented a new and improved Insect-Destroyer; and I do hereby declare that the following is a full, clear, and exact description thereof, which will enable those skilled in the art to use the same.

This invention relates to a new and useful improvement in the treatment of fruit-trees, for the destruction of the vermin which prey upon and injure or destroy the trees, or the fruit thereon; and the invention consists in applying to the tree a chemical solution, composed of the ingredients hereinafter described, in combination with iron, whereby the insects are destroyed or banished, and the health and vigor of the tree are preserved or restored, after being injured by the curculio, borer, or other insects, or by the many diseases to which fruit-trees are subject.

In carrying out my invention, I form a solution composed as follows, viz: Acetic acid, two ounces; oil of wormwood, one ounce; oil of fire-weed, one-fourth of an ounce. The application of this composition is made through the medium of iron, in the shape of the ordinary fence-nail, or in any equivalent manner.

It is not unreasonable to suppose that many of the diseases to which fruit-trees are liable are, like the diseases of the human body, induced by transitions from heat to cold, or thawing and freezing, by which the system is robbed of some one or more of its essential properties.

Iron, as well as other elementary substances, is absorbed by living vegetation, as well as by living animals, and from experiment and observation, I am convinced that fruit-trees, owing to unfavorable location or exposure to the action of the elements, lose their vigor, and become diseased, for the want or lack of that which my solution and application supply.

In making the application, I subject the iron nail or other piece of iron to the action of my solution for some hours, by which the iron becomes more or less oxidized. The solution and the oxide form a coating on the nail or iron, and in this condition it is embedded in the tree below the surface of the ground, and also in the crotch of the tree, and in as many places or numbers as may be deemed necessary. This treatment has had the effect of ridding plum, peach, and other fruit-trees of the insects which prove so destructive, and of restoring diseased trees to health and vigor, in hundreds of instances where it has been tried. A sample of the solution is herewith forwarded, marked A.

Having thus described my invention, I claim as new, and desire to secure by Letters Patent—

The solution, composed substantially as herein described, and applied in combination with iron, substantially as and for the purposes specified.

ALEXANDER McKENZIE.

Witnesses:
    GARRARDUS P. DEYOE,
    PELEG S. PERLEY.